(12) United States Patent
Holt

(10) Patent No.: US 6,174,142 B1
(45) Date of Patent: Jan. 16, 2001

(54) ELASTOMERIC PUMP HOUSING

(76) Inventor: Andrew J. Holt, 2659 Boyd St., Des Moines, IA (US) 50317

( * ) Notice: Under 35 U.S.C. 154(b), the term of this patent shall be extended for 0 days.

(21) Appl. No.: 09/413,005

(22) Filed: Oct. 5, 1999

(51) Int. Cl.$^7$ ........................................... F04B 17/00
(52) U.S. Cl. ........................... 417/363; 417/423.15
(58) Field of Search ............................. 417/363, 423.15

(56) References Cited

U.S. PATENT DOCUMENTS

D. 247,436 * 3/1978 Willinger et al. ................. D15/8
3,671,151 * 6/1972 Duke et al. ....................... 417/413

* cited by examiner

Primary Examiner—Charles G. Freay
Assistant Examiner—Robert Z. Evora
(74) Attorney, Agent, or Firm—Henderson & Sturm LLP

(57) ABSTRACT

A pump for moving liquids has an elastomeric housing disposed around the pump. The housing has at least four sides which are primarily planar, whereby the pump can be supported on the bottom of one of the flat sides by orienting the pump so that one of the primarily planar sides is down. This allows the pump to remain in such chosen orientation and the elastomeric housing, which is typically rubber, will substantially prevent vibration of the pump to be transmitted to the surroundings of the pump.

3 Claims, 3 Drawing Sheets

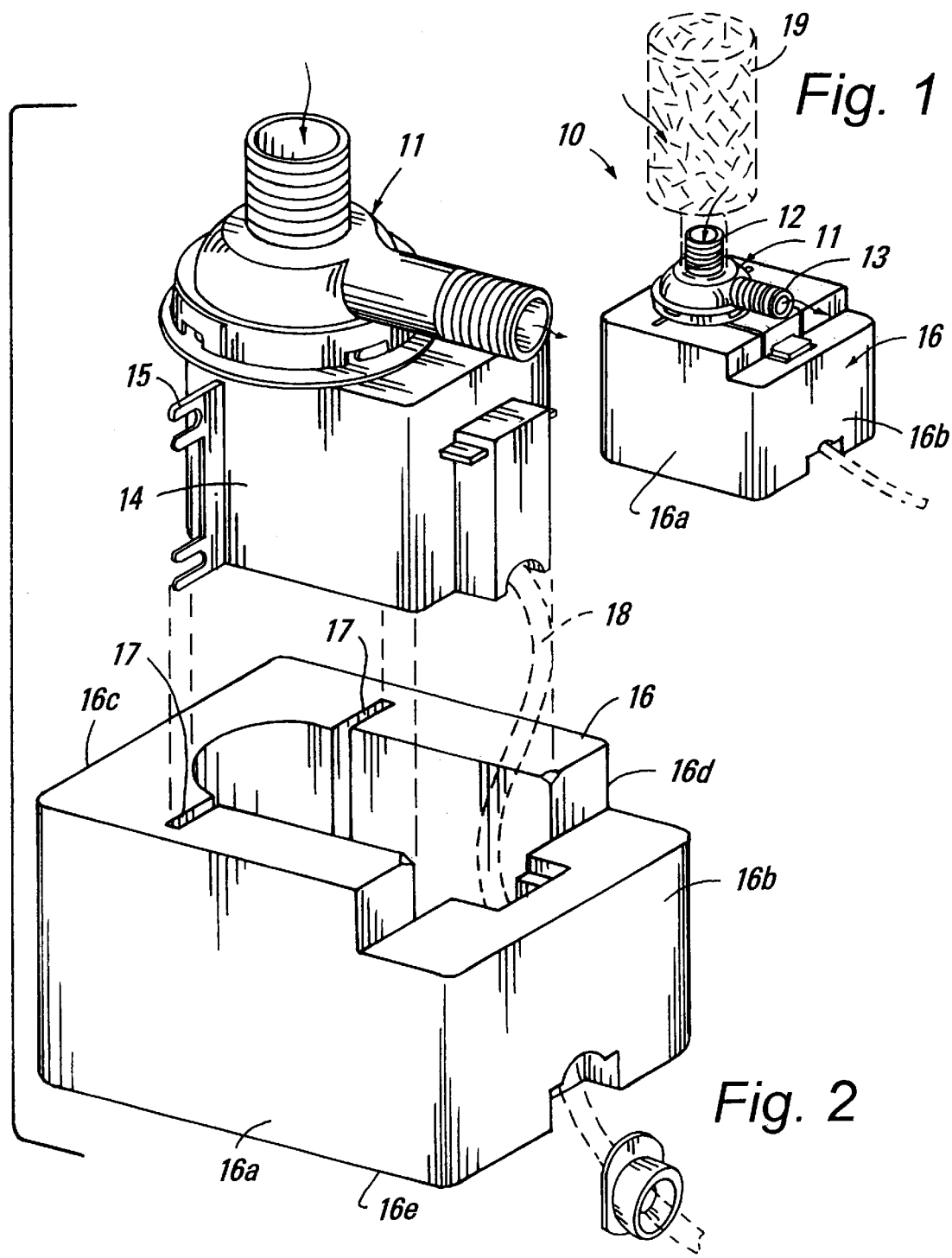

ELASTOMERIC PUMP HOUSING

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

This invention relates generally to pumps, and more particularly to pumps of the type typically used to form fountains in small outdoor ponds or the like.

2. Description of the Related Art

Prior art pumps have typically been of many shapes, primarily dictated by the shape of what is inside of the pump housing. Most of these prior art pumps tend to vibrate when they are placed on a surface above or below the water and this causes them to want to move from where they are placed or if they are plumbed into place, to cause the connections to loosen. Consequently there is a need for a pump which will overcome the aforementioned deficiencies of the prior art.

BRIEF SUMMARY OF THE INVENTION

The present invention relates to a pump for moving liquids having an elastomeric housing disposed around the pump. The housing has at least four sides which are primarily planar whereby the pump can be supported on the bottom of one of the flat sides by orienting the pump so that one of the primarily planar sides is down. This allows the pump to remain in such chosen orientation and the elastomeric housing, which is typically rubber, will substantially prevent vibration of the pump to be transmitted to the surroundings of the pump.

An object of the present invention is to provide an improved pump and combination pump housing.

Another object of the present invention is to provide an elastomeric housing for being disposed around a pump to allow the pump to be placed on one of at least four primarily planar sides whereby the pump can be supported on the bottom of a pool of water having a flat surface thereon by orienting said pump so that one of the primary planar sides is down.

A still further object of the present invention is to provide a rubber or elastomeric housing which will substantially prevent vibration of the pump to be transmitted to the surroundings of the pump.

Other objects, advantages, and novel features of the present invention will become apparent from the following detailed description of the invention when considered in conjunction with the accompanying drawings.

BRIEF DESCRIPTION OF THE SEVERAL VIEWS OF THE DRAWINGS

FIG. 1 is a perspective view of the present invention showing a pump in a rubber pump housing constructed in accordance with the present invention;

FIG. 2 is a perspective exploded view of the present invention showing a pump having a rigid housing exploded from a rubber housing into which the pump is placed;

DETAILED DESCRIPTION OF THE INVENTION

Figures 3, 4, 5:
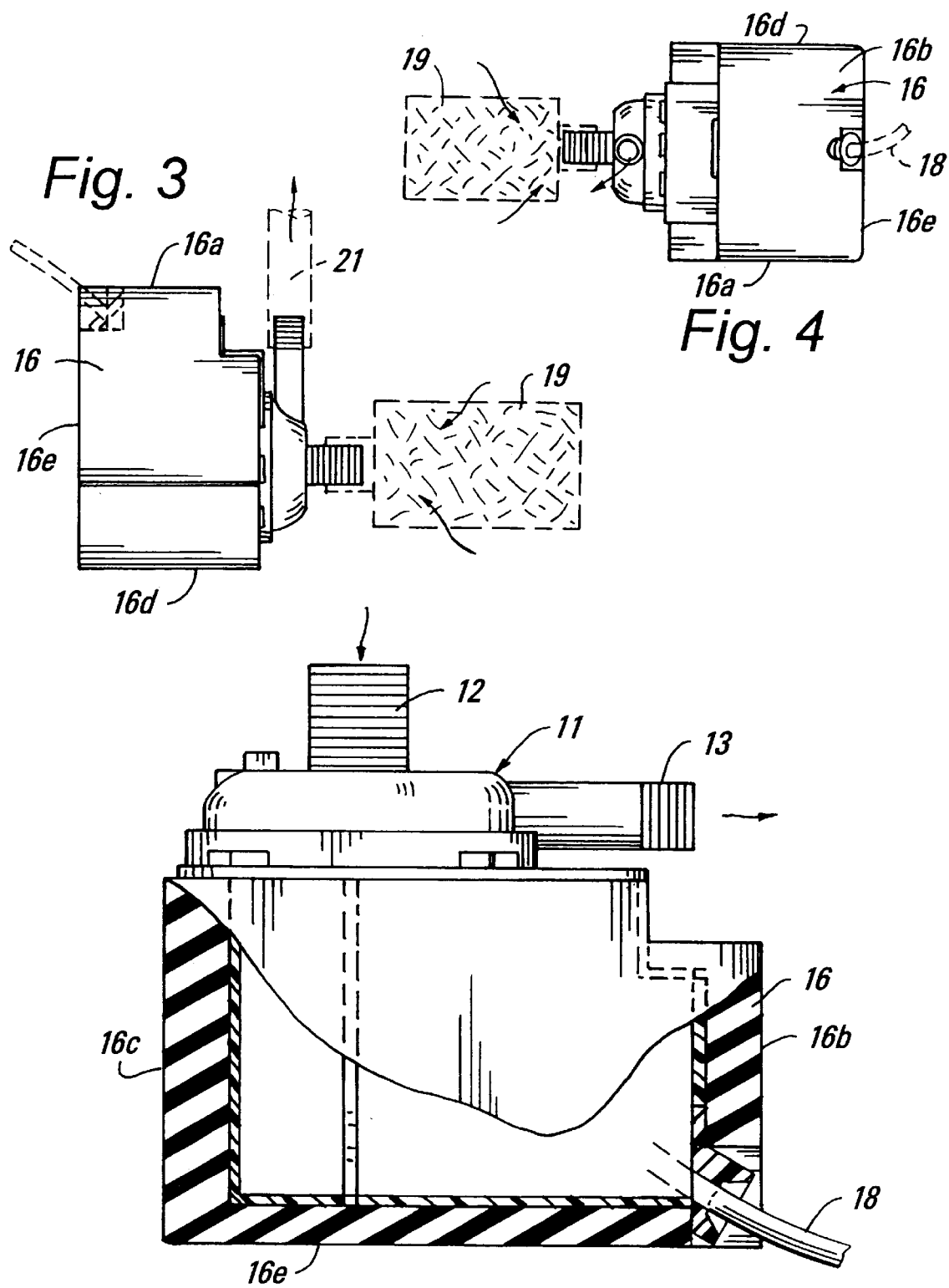
FIG. 3 is a side view of the present invention showing the pump disposed on one of its planar sides and having a filter to clean incoming liquids, and an outlet with the flow indicated by the arrows of FIG. 3.
FIG. 4 is a top view of the invention as shown in the orientation of FIG. 3.
FIG. 5 is a partial cross sectional view of the present invention shown in the orientation of FIG. 1.
Figure 6:
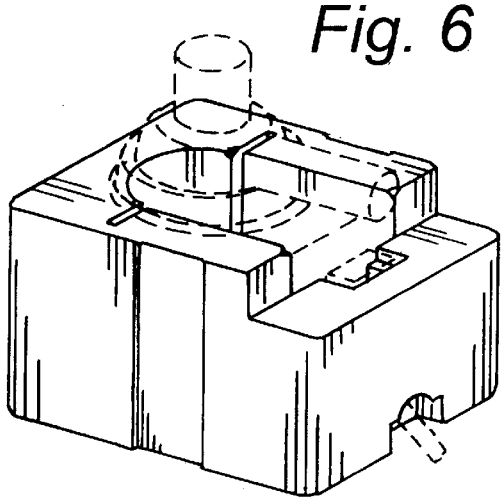
FIG. 6 is a decorative version of the present invention showing the pump in dashed lines.
Figure 9:
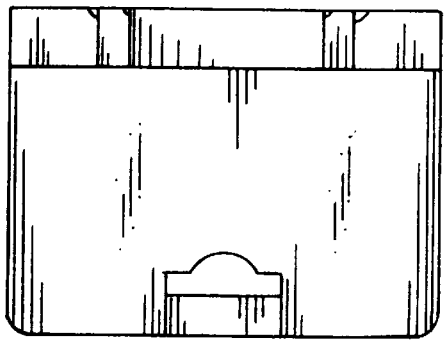
FIG. 9 is a front view of the FIG. 6 embodiment.
Figure 7:
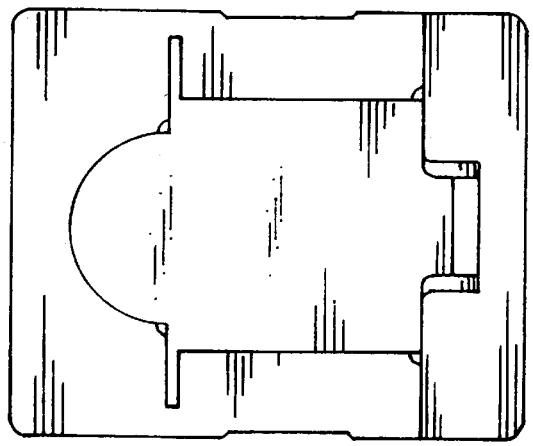
FIG. 7 is a top plan view of the FIG. 6 embodiment.
Figure 10:
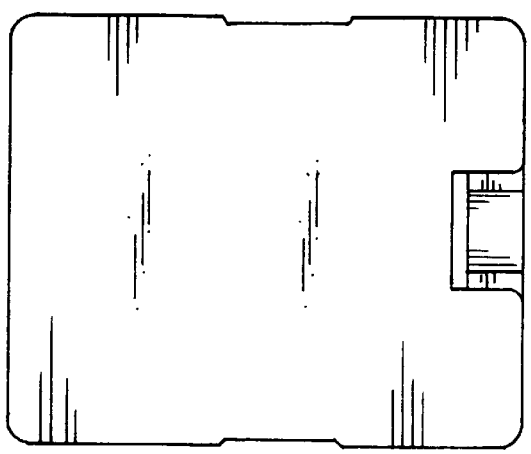
FIG. 10 is a bottom plan view of the FIG. 6 embodiment.
Figure 8:
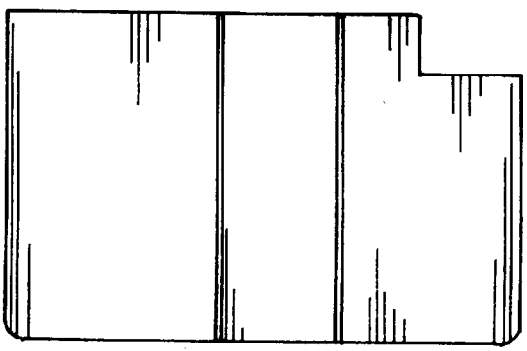
FIG. 8 is a side elevational view showing the FIG. 6 embodiment, with the opposite side being a mirror image of FIG. 7.
Figure 11:
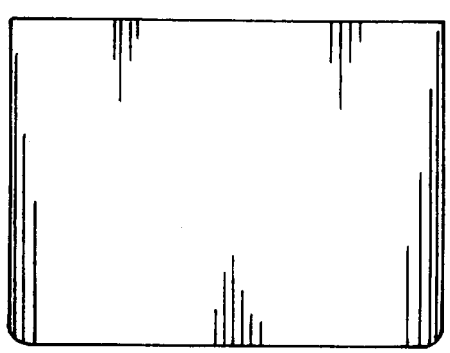
FIG. 11 is a rear view of the FIG. 6 embodiment.

Referring now to the drawings, wherein like reference numerals designate identical or corresponding parts throughout the several views, FIG. 1 shows the present invention (10) having a pump section (11) with an inlet port (12) and an outlet port (13) and an electric motor and pump (not shown) which are inside of a hard plastic housing (14) as shown in FIG. 2.

A molded rubber housing (16) can best be seen in FIG. 2 and is shown in its operative position in FIGS. 1, 3, 4 and 5. The rubber housing (16) has slots (17) therein for receiving flanges (15) on the pump (11) and the interior of the rubber housing (16) is generally configured to be substantially the same shape as the outside of the pump (11). The pump (11) has an electric cord (18) which leads to an electric motor (not shown) as mentioned above.

In operation, a filter (19) is disposed on the inlet port (12) as shown in FIGS. 1, 3 and 4. When the pump shown in FIG. 1 is placed at the bottom of a shallow pond or the like, the water will enter the filter (19) and through the inlet port (11) and pass through the pump (not shown) and out the outlet port (13), typically through a hose (21) (FIG. 3) which can lead to a nozzle or the like to form a fountain, or perhaps only to re-circulate the water to a waterfall or the like.

The housing (16) is preferably formed of rubber, but can be made of any kind of other similar substance, such as an elastomeric plastic material or foam rubber. The rubber housing (16) has a plurality of flat sides (16a), (16b), (16c), (16d) and a flat bottom (16e). The pump can be placed on any one of the substantially flat sides (16a), (16b), (16c), (16d) or (16e) and it will substantially retain this orientation if placed on a flat surface, either above or below a pool of water. Accordingly, when the pump (11) is turned on, the flow will occur substantially as shown by the arrows in FIGS. 1–5.

Obviously many modifications and variations of the present invention are possible in light of the above teachings. It is therefore to be understood that, within the scope of the appended claims, the invention may be practiced otherwise than as specifically described.

I claim:

1. A vibration limiting apparatus disposed on a generally flat floor of a body of water comprising:

a submersible pump for moving liquids; and, an elastomeric housing disposed around said submersible pump, said elastomeric housing having at least four sides which are primarily planer; one of which intersects the others on three edges; wherein said elastomeric sides are sized to support the submersible pump on the flat floor, whereby said submersible pump is adapted to be directly supported on the floor of said body of water on a selected one of said primarily planer sides; wherein, the frictional engagement between said elastomeric housing and the floor of the body of water maintains the submersible pump in a chosen orientation and location relative to the floor of the body of water and the elastomeric housing limits the vibrations generated by said submersible pump from transmission into said body of water.

2. The apparatus of claim 1 wherein said elastomeric housing is rubber.

3. The apparatus of claim 1 wherein said pump is an electric pump.

* * * * *

UNITED STATES PATENT AND TRADEMARK OFFICE
CERTIFICATE OF CORRECTION

PATENT NO. : 6,174,142 B1
DATED : January 16, 2001
INVENTOR(S) : Andrew J. Holt

It is certified that error appears in the above-identified patent and that said Letters Patent is hereby corrected as shown below:

<u>Title page,</u>
Item [73], Assignees, insert the following:
-- Water Creations, Des Moines, Iowa --

Signed and Sealed this

Seventh Day of May, 2002

Attest:

Attesting Officer

JAMES E. ROGAN
Director of the United States Patent and Trademark Office